United States Patent [19]
Puckett et al.

[11] 3,760,589
[45] Sept. 25, 1973

[54] THROTTLING MECHANISM FOR CONTROLLING THE THRUST LEVEL OF A SOLID PROPELLANT ROCKET MOTOR

[75] Inventors: William R. Puckett, Trinity; John H. Kelly, Hartselle; Robert E. Overall; John J. De Haye, both of Huntsville, all of Ala.

[73] Assignee: Thiokol Chemical Corporation, Bristol, Pa.

[22] Filed: Mar. 24, 1969

[21] Appl. No.: 809,715

[52] U.S. Cl.................. 60/253, 60/271, 239/265.19
[51] Int. Cl............................................... F02k 9/04
[58] Field of Search.................. 60/234, 242, 254, 60/39.25, 271, 39.47; 239/265.19

[56] References Cited
UNITED STATES PATENTS

| | | |
|---|---|---|
| 2,470,162 | 5/1949 | Goehmann.......................... 102/49.3 |
| 2,922,050 | 1/1960 | Loughran............................ 60/39.47 |
| 2,968,919 | 1/1961 | Hughes et al........................ 60/242 |
| 3,059,425 | 10/1962 | McSherry et al..................... 60/242 |
| 3,078,668 | 2/1963 | Burriss................................ 60/39.25 |
| 3,094,072 | 6/1963 | Parilla................................ 244/3.22 |
| 3,192,709 | 7/1965 | Hardy............................... 239/265.19 |
| 3,504,860 | 3/1970 | Wilson.............................. 239/265.19 |

FOREIGN PATENTS OR APPLICATIONS

| | | |
|---|---|---|
| 126,325 | 12/1916 | Great Britain..................... 102/49.3 |
| 1,178,470 | 12/1958 | France.............................. 102/49.3 |

*Primary Examiner*—Samuel Feinberg
*Attorney*—Thomas W. Brennan

[57] ABSTRACT

A throttling mechanism for the nozzle of a solid propellant rocket motor that is capable of selectively controlling the effective area of the discharge orifices of the nozzle whereby the magnitude of the thrust of the solid propellant rocket motor may be varied.

1 Claim, 4 Drawing Figures

PATENTED SEP 25 1973

William R. Puckett INVENTORS
John H. Kelly
Robert E. Overall
John J. DeHaye

BY Robt J Williams ATTORNEY

William R. Puckett
John H. Kelly
Robert E. Overall
John J. DeHaye
INVENTORS

BY Robt J Williams ATTORNEY

PATENTED SEP 25 1973 3,760,589

William R. Puckett INVENTORS
John H. Kelly
Robert E. Overall
John J. DeHaye

BY Robt J Williams ATTORNEY

THROTTLING MECHANISM FOR CONTROLLING THE THRUST LEVEL OF A SOLID PROPELLANT ROCKET MOTOR

BACKGROUND OF THE INVENTION

1. Field of the Invention

It is a well-known fact that the thrust level of liquid fueled rockets can be controlled by modifying the amount of liquid fuel that is injected into the combustion chamber. It is different, however, with solid propellant rocket motors. In this type of rocket motor the entire fuel supply is in the combustion chamber and once such fuel is ignited, the supply thereof to the combustion chamber, as in liquid fueled rockets, cannot be modified.

Thus, solid propellant rocket motors are usually designed for a single thrust level and such level is directly proportional to the pressure in the combustion chamber and is inversely proportional to the area of the discharge orifices of the nozzle, thus it was found that by varying the area of the discharge orifices of the nozzle, the thrust level of a solid propellant rocket motor could be controlled within certain limits. The instant invention, therefore, relates to a throttling mechanism for selectively varying the discharge orifices of a nozzle of a solid propellant rocket motor whereby the thrust level of the solid propellant rocket motor may be controlled to meet operational requirements in the flight of the solid propellant rocket motor.

2. Description of the Prior Art

Several suggestions have culminated in structures for varying the throat area of a nozzle for a solid propellant rocket motor and such structures are symbolized by a conical or frusto-conical plug that is moved longitudinally of the solid propellant rocket motor, usually in alignment with the longitudinal axis of the solid propellant rocket motor so that it may enter or be withdrawn from the throat of the nozzle. However, since such structures are subjected directly to the erosive powers of the intense heat of the combustion gases that are projected through the throat of the nozzle, there are many drawbacks to such structures, because of the deteriorating erosive effects that are created by the intense heat of the combustion gases.

The instant invention, however, contemplates a throttling mechanism that is not directly affected by the intense heat of the combustion gases, because only one element of the throttling mechanism is directly subjected to the intense heat of the combustion gases and such element can be made of a material that is not adversely affected by exposure to the intense heat of the combustion gases of the solid propellant rocket motor.

SUMMARY OF THE INVENTION

This invention relates to improvements in throttling mechanisms for controlling the thrust level of a solid propellant rocket motor and more particularly it relates to a throttling mechanism that includes an erosion resistant element that creates movement transversely of the discharge orifice of the nozzle for the solid propellant rocket motor to vary and control the thrust level of the solid propellant rocket motor.

Most of the structures that have been suggested for varying the thrust level of a solid propellant rocket motor are not completely satisfactory, because they have a tendency to vary the ballistic behavior of the solid propellant rocket motor and are usually associated with the solid propellant rocket motor so that they are directly exposed to the intense heat generated by the combustion gases, creating deteriorating erosive effects on such structures that will adversely affect their function in carrying out the method of control for which they have been designed.

It is an object of this invention, therefore, to provide a throttling mechanism for a solid propellant rocket motor that is associated with a solid propellant rocket motor in such a manner that it is not subjected directly to the intense heat created by the combustion gases of a solid propellant rocket motor and is, therefore, not subjected to any deteriorating erosive affects occasioned by the impact of such intense heat that is created by the combustion gases of the solid propellant rocket motor.

The throttling mechanism embodying the instant invention provides a method for regulating the pressure created in a solid propellant rocket motor that results from the burning of the solid propellant grain in the combustion chamber of the solid propellant rocket motor and is equally effective in use with a gas generator that may or may not be used in conjunction with the solid propellant rocket motor.

The present throttling mechanism is also capable of meeting new mission profiles of new currently proposed solid propellant rocket motors or missiles. The throttling mechanism can be adapted to small or large solid propellant rocket motors or missiles and it can be mounted on the air frame or motor case of a solid propellant rocket motor where there is limited space or where it is necessary to control small discharge motors or gas generators.

The throttling mechanism embodying the instant invention will provide precise pressure control for solid propellant rocket motors and gas generators and it can be manufactured at low cost in many sizes to control small or large flow streams of combustion gases to meet operational requirements.

It is another object of this invention, therefore, to provide a throttling mechanism that is able to control small or large flow streams of combustion gases in a solid propellant rocket motor or a gas generator.

With the above and other objects and advantages in view that may appear to one skilled in the art and which will be more readily apparent from the following detailed description, it is to be understood that the invention consists of the more detailed structure as it appears in the accompanying drawings in which:

DESCRIPTION OF THE PREFERRED EMBODIMENTS

Figure 1:
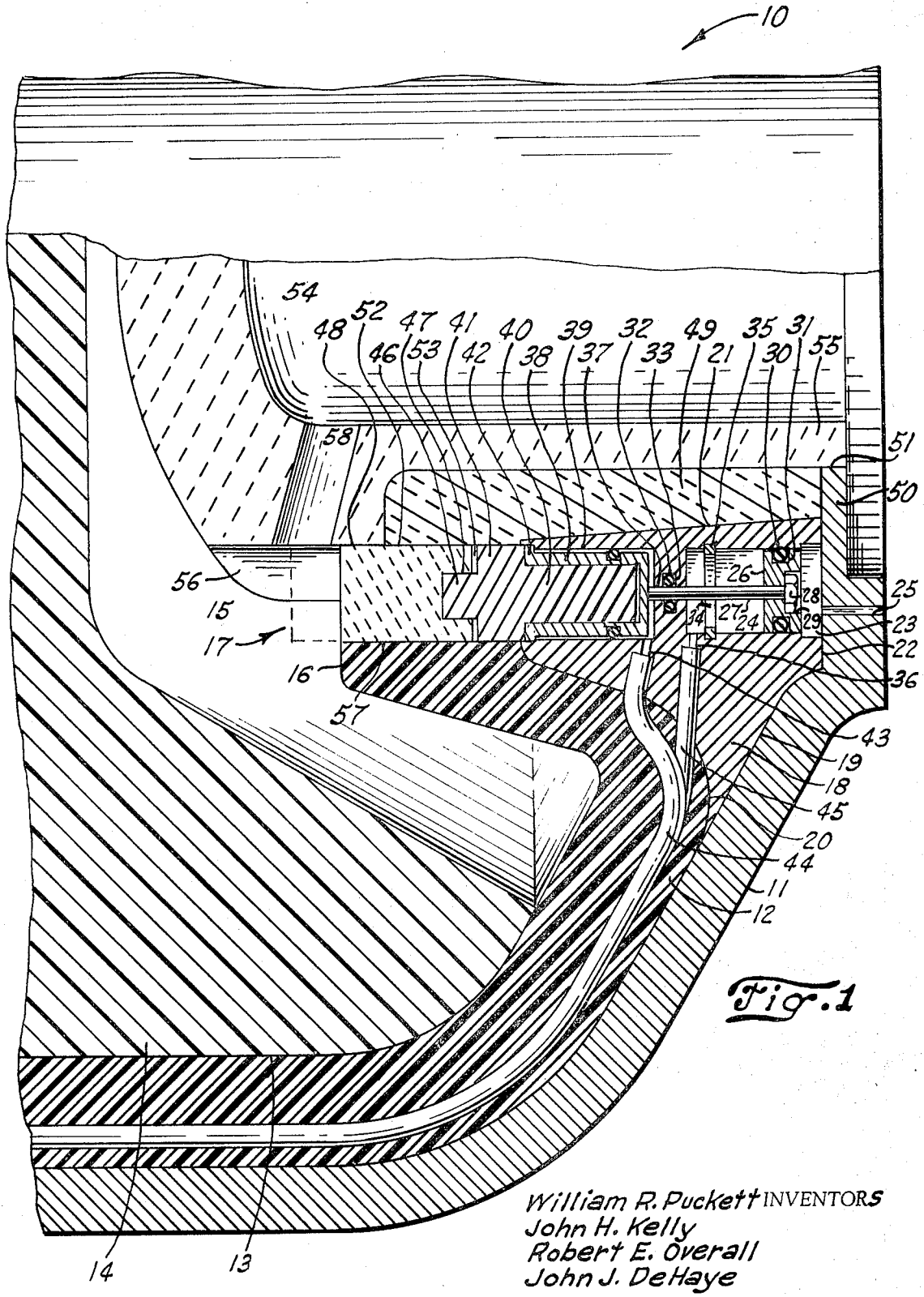
FIG. 1 is a detailed fragmentary sectional view, partly in elevation and partly broken away, showing one form of the throttling mechanism embodying the invention.

Referring more in detail to the drawings wherein like parts are designated by like reference numerals, and referring more specifically to FIG. 1, wherein the reference numeral 10 is used to generally designate a solid propellant rocket motor and showing the manner in which one form of the invention is mounted thereon.

The solid propellant rocket motor 10 is of the conventional type that employs a removable separate domed-shaped aft end 11, that is secured to the cylindrical section of the motor case of the solid propellant rocket motor 10, at a demarkation line that is consistent with the assembly of the aft end 11 to the motor case, by conventional fastening means such as bolts, splines, etc.

A molded insert 12 of insulating material is bonded to a portion of the inner surface of the aft end 11 and forms a continuation of the insulation that is also conventionally bonded to the inner surface of the cylindrical section of the motor case of the solid propellant rocket motor 10. The insert 12, and of course the insulation in the cylindrical section of the motor case, define therein a combustion chamber 13 and positioned in the combustion chamber 13, by a casting method or any other conventional loading method, is a solid propellant grain 14 which is provided in the aft end thereof with a cavity 15.

It will be noted in FIG. 1 that the molded insert 12 has a circular neck portion 16 that extends into the cavity 15 and provides a portion of the throttling mechanism 17 that is employed in this form of the invention. The throttling mechanism 17 also includes a ring-shaped member 18 which may be of unitary structure or divided into sector-shaped segments which ever is most convenient for the assembling of the throttling mechanism 17, as will be later described.

One outer surface 19 of the ring 18 is contoured to conform to the configuration of the inner surface of the aft end 11 and is secured thereto by bonding or other well-known means, as will be required to maintain the ring 18 in proper position. Another outer surface 20 of the ring 18 is contoured to conform to the configuration of the outer surface of the molded insert 12 and is bonded thereto and the molded insert 12 also assists in maintaining the ring 18 in its proper position in relation to the aft end 11, as shown in FIG. 1.

The inner surface 21 of the ring 18 is circular and is tapered inwardly so that the diameter of the circular inner edge of inner surface 21 is greater than the diameter of the circular outer edge of the surface 21 and another outer surface 22 of the ring 18 has an open face circular recess 23 therein which is in direct communication with a cylindrical cavity or cylinder 24 and the recess 23 is vented to the atmosphere by means of an outlet port 25 in the aft end 11 to permit the escape of any air that is trapped in the cylinder 24 during the operation of the throttling mechanism 17.

A piston 26 is mounted for reciprocation within the cylinder 24 and is connected to a piston rod 27 by means of a fastener 28 which is received in a circular seat 29 in the outer surface of the piston 26. An O-ring 30 positioned in an annular groove 31 in the periphery of the piston 26 prevents leakage past the piston 26 within the cylinder 24, and a second O-ring 32 positioned in an annular groove 33 in the ring 18 in circumjacent relation to the piston rod 27 prevents leakage between the piston rod 27 and the ring 18. A circular split ring 34 seated in a groove 35 in the inner surface of the cylinder 24 limits the reciprocal movement of the piston 26 so that it will not close an inlet-outlet port 36 in the ring 18 that communicates with the cylinder 24.

The piston rod 27 extends through a bore 37 in the ring 18 to be secured at its end to a cup-shaped piston 38 that is mounted for reciprocation in a second cylindrical open faced cavity or cylinder 39 that is formed in the ring 18 in axial alignment with the cylinder 24.

The cup-shaped piston 38 has a cylindrical plug 40 made from a heat dissipating material positioned therein, and the plug 40 has an enlarged circular-shaped head end 41 thereon which extends outwardly of the cylinder 39 and the cup-shaped piston 38 has an annular peripheral flange 42 thereon that engages the open end of the cylinder 39 to limit the movement of the cup-shaped piston 38 by reason of the engagement of the flange 42 on the cup-shaped piston 38 with the open end of the cylinder 39 so that the cup-shaped piston 38 will not close an inlet-outlet port 43 in the ring 18 that communicates with the cylinder 39.

Fluid pressure supply lines 44 and 45 mounted in and extending through the insert 12 and ring 18 have direct communication with the inlet-outlet ports 36 and 43 so that a fluid under pressure may be supplied by any suitable pressure producing mechanism to reciprocate the pistons 26 and 38 during the operation of the throttling mechanism 17, as will be later described. The pressure producing mechanism, not shown, may be mounted on the aft end 11 or on the air frame of the solid propellant rocket motor 10 as is most convenient during the assembly of the solid propellant rocket motor 10.

The outer surface of the head end 41 of the plug 40 has integral therewith a centrally located boss 46 that is received in a seat 47 in a third piston 48 that is made from an erosion resisting material such as graphite or the like.

A segmented ring 49 of an erosion resisting material is inserted through the open end of the aft end 11 until it abuts an inwardly extending flange 50 that defines thereby the exhaust opening 51 of the aft end 11. The ring 49 has semicircular grooves 52 therein that form a portion of a cylinder 53 in which the head end 41 of the plug 40 and the piston 48 reciprocate, also when a nozzle 54 is inserted into the open end of the aft end 11 until its aft peripheral edge 55 is flush with the outer surface of the flange 50, semicircular grooves 56 in the outer surface of the nozzle 54 also form a portion of the cylinder 53 for the head end 41 of the plug 40 and the piston 48, the remainder of the cylinder 53 for these elements being formed by semicircular grooves 57 in the insert 12.

Viewing FIG. 1, it will be noted that angularly disposed exhaust ports 58 or discharge orifices are formed in the head end of the nozzle 54 and the number of these ports 58 that are to be provided in the nozzle 54 depend upon the flight requirement of the solid propellant rocket motor on which the throttling mechanism 17 is mounted.

As previously stated, all of the elements forming the throttling mechanism 17 are inserted through the open end of the aft end 11 and the entire assembly, as previously described, is positioned on the open end of the motor case of the solid propellant rocket motor 10 and the forward end of the nozzle 54 will extend into the cavity 15 in the solid propellant grain 14, the insert 12 will be aligned with the insulation in the motor case of the solid propellant rocket 10 and the outer surface of the aft end 11 at its engagement with the motor case will provide a flush outer surface with the outer surface of the motor case. The pressure producing mechanism is then mounted as previously described and a remote control and guidance system, not shown, for the solid propellant rocket motor 10 is mounted at a convenient location on the solid propellant rocket motor 10 or the air frame for the solid propellant rocket motor 10, as required.

Viewing FIG. 1, it will be noted that the path of reciprocation of the piston 48, as shown by dotted lines, will vary the size of the exhaust ports 58 and control the amount of the combustion products formed in the combustion chamber 13 that will exhaust through the exhaust ports 58 and by the control of the reciprocation of the piston 48 and thus controlling the size of the exhaust ports 58, the magnitude of the thrust of the solid propellant rocket motor 10 will be varied.

Figure 2:
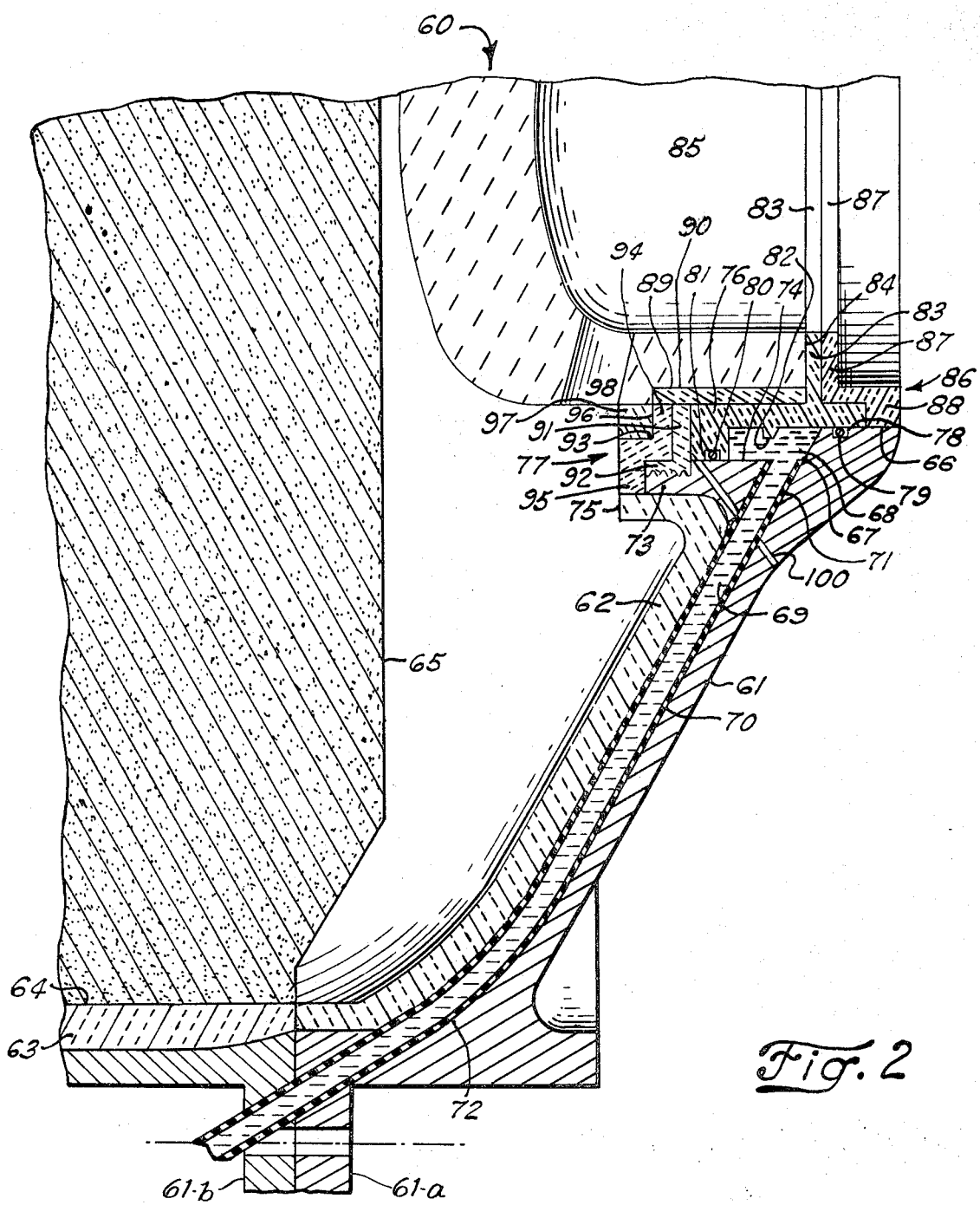
FIG. 2 is a view similar to FIG. 1, showing another form of the invention.
Figure 3:
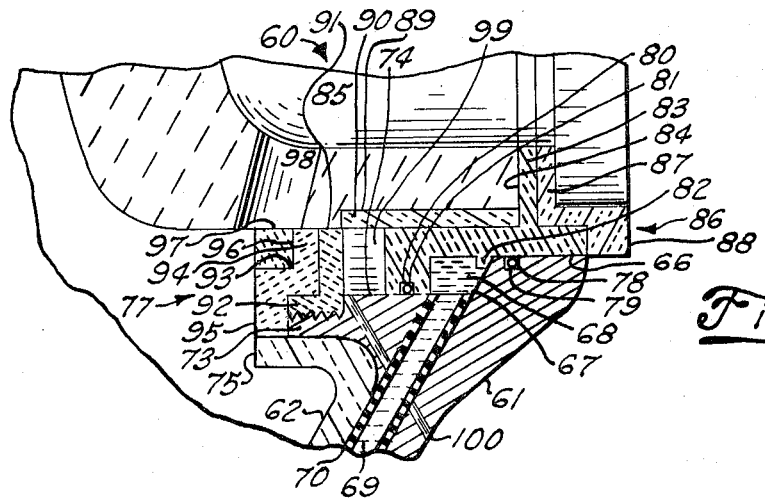
FIG. 3 is a detailed fragmentary sectional view on a reduced scale, showing the operation of the form of the invention of FIG. 2.

In FIGS. 2 and 3 another form of the throttling mechanism embodying the invention is shown and in these Figures the reference numeral 60 is used to generally designate a conventional type solid propellant rocket motor that employs a removable separate domed-shaped aft end 61, that is secured to the cylindrical section of the motor case of the solid propellant rocket motor 60 at flanges 61-a and 61-b by conventional fastening means such as bolts, splines, etc.

The aft end 61 has a layer of insulation 62 bonded to the inner surface thereof and a layer of insulation 63 bonded to the interior surface of the motor case define thereby a combustion chamber 64 in which there is positioned, by a casting method or any other conventional loading method, a solid propellant grain 65.

The aft end 61, as is conventional, is provided with a circular exhaust opening 66 and the inner surface 67 of the aft end 61 contiguous with the exhaust opening 66, assists in defining a fluid reservoir 68 for a fluid 69 and also functions as an abutment for a tubular member 70 that has the inner end thereof positioned in a passageway 71 in the aft end 61 and the remainder of the tubular member 70 is positioned in contact with the inner surface of the head end 61 before the layer of insulation is bonded into the aft end 61 and the tubular member 70 extends outwardly of the aft end 61 through a passageway 72 therein to be connected to a conventional fluid pressure system, not shown, that can be mounted on the solid propellant rocket motor 60 or mounted on the air frame of the solid propellant rocket motor 60. The tubular member 70 conducts fluid under pressure from the fluid pressure system to the fluid reservoir, as shown in FIGS. 2 and 3.

It will be noted in FIGS. 2 and 3 that the aft end 61 has a neck portion 73 and that the surface 74 thereof also assists in defining the reservoir 68 and that the insulation 62 also has a neck portion 75 that conforms to the outer surface of the neck portion 73 of the aft end 61.

The surface 74 of the neck portion 73 of the aft end 61 and the surface of the aft end 61 defining the exhaust opening 66 form bearing surfaces for an ell-shaped piston 76 of a throttling mechanism 77 and the surface of the aft end 61 defining the exhaust opening 66 is provided with an annular groove 78 in which is positioned an O-ring 79.

The piston 76 in that portion thereof confronting the surface 74 of the neck portion 73 is provided with an annular groove 81 in which is positioned an O-ring 80 and the O-rings 79 and 80 prevent leakage of the fluid 69 between surface 74 and the surface of the aft end 61 defining the exhaust opening 66 and the piston 76 defines the remainder of the reservoir 68 and the inner surface of the piston 76 defining the reservoir 68 has a projection or stop 82 integral therewith that engages the inner surface 67 of the aft end 61 to prevent aft movement of the piston 76, as shown in FIG. 3 and as will be later described.

The piston 76 has formed integrally with the outer surface thereof adjacent the aft end thereof an inwardly right angularly extending ring-shaped projection 83 which forms an abutment for the aft peripheral edge 84 of a nozzle 85 which is made of an erosion resisting material as is the piston 76.

A substantially zee-shaped ring shaped member 86 is positioned on the aft end of the piston 76 with a portion 87 thereof in abuting relation with and of equal width to the projection 83 of the piston 76 and a second portion 88 thereof is in abuting relation with and of equal thickness to the aft end of the piston 76.

The nozzle 85 has an annular seat 89 in the outer surface thereof contiguous with the aft peripheral edge 84 thereof and a ring-shaped bearing member 90 made from an erosion resisting material is positioned in the seat 89 and has sliding engagement with the piston 76.

A substantially ell-shaped ring member 91 of erosion resisting material has a portion 92 thereof threadably connected to the neck portion 73 of the aft end 61 and the ring member 91 is of equal size to the piston 76 and forms an abutment therefor. A second substantially zee-shaped ring member 93 is mounted on the ring member 91 with a portion 94 thereof in abutting relation with the ring member 91 and a portion 95 thereof in abutting relation to the edge of the portion 92 of the ring member 91 and the peripheral edge of the neck portion 73 of the aft end 61. By reason of the shape of the ring member 91, a seat 96 is formed and an annular ring-shaped member 97 of erosion resisting material is positioned so that one side thereof is contiguous with the annular surface formed by the inner peripheral edge of the portion 94 and the inner peripheral edge of the ring member 91.

Viewing FIGS. 2 and 3, it will be noted that angularly disposed exhaust ports or discharge orifices 98 are formed in the head end of the nozzle 85 and the number of these ports 98 that are to be provided in the nozzle 85 depend upon the flight requirements of the solid propellant rocket motor on which the throttling mechanism 77 is mounted.

In assembling the throttling mexhanism 77, the ring member 91, the zee-shaped member 93 and the ring-shaped member 97 may be bonded together in unitary structure and after the piston 76 and the nozzle 85 mounted thereon have been properly positioned by being inserted through the open end of the aft end 61, the unitary structure composed of members 91, 93 and 97 are threadably engaged wth the neck portion of the aft end 61 and the throttling mechanism 77 is assembled for operation.

In the operation of this form of the invention, the operation of the throttling mechanism 77 is controlled in one direction by the pressure created by the combustion gases that are created in the combustion chamber 64 as the solid propellant grain 65 is burned. Such pressure will eventually be sufficient to move the nozzle 85 from the position, as shown in FIG. 2, to a position as shown in FIG. 3, wherein the members 93 and 97 vary the size of the ports 98 to control and vary the magnitude of the thrust of the solid propellant rocket motor 60.

It will be noted from viewing FIG. 3 that as the piston 76 and nozzle 85 move aft, a cavity 99 is created at the forward end of the piston 76 and a vent 100 extending to the atmosphere communicates with the cavity 99.

The cavity 99 is formed ahead of the piston 76 so that when the fluid 69 is pressurized, the nozzle 85 will be moved back to the position of the assembly, as shown in FIG. 2, to open the ports 98 during the flight of the solid propellant rocket motor 60. Thus, by relieving the pressure on the fluid 69 and relying on the pressure created by the combustion gases, the throttling mechanism 77 will operate as described to achieve the desired operational requirements for the solid propellant rocket motor 60 during the flight thereof.

Figure 4:
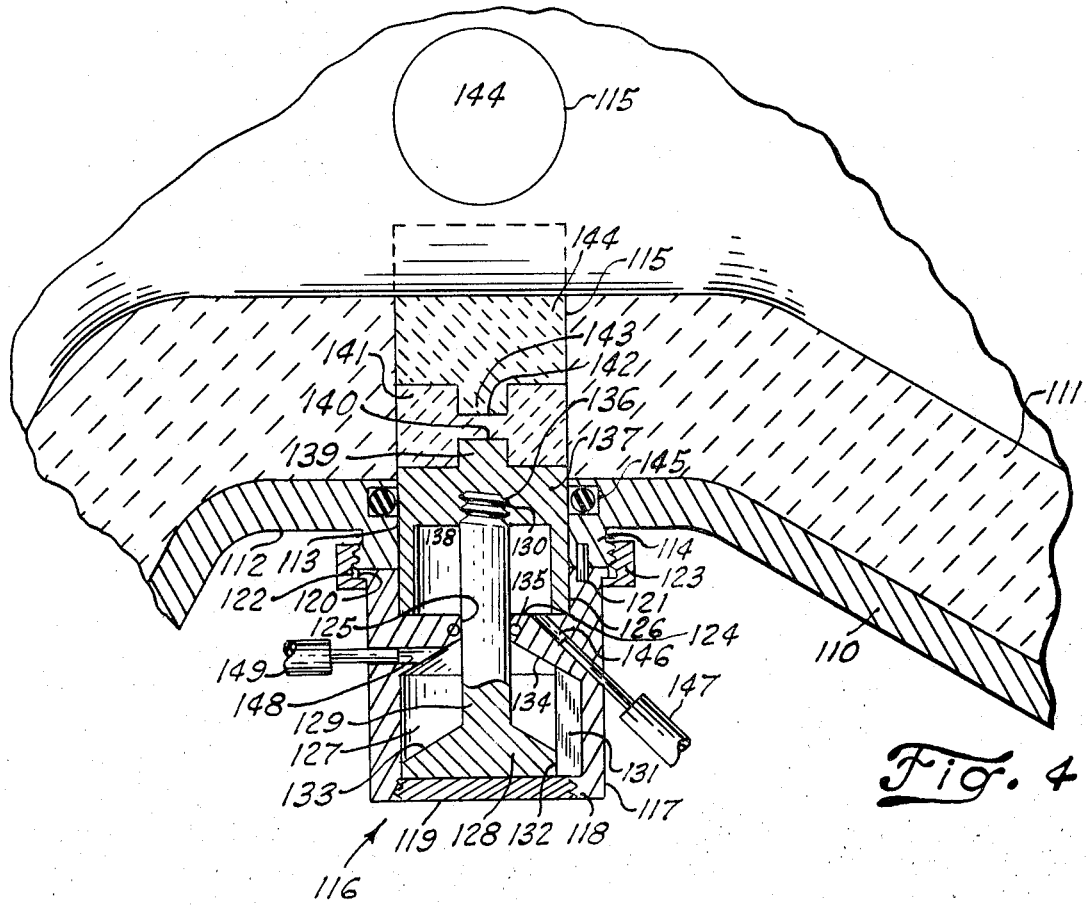
FIG. 4 is a detailed fragmentary sectional view, partly in elevation and partly broken away, showing still another form of the invention.

In FIG. 4, still another form of the throttling mechanism embodying the invention is shown and the reference numeral 110 is used to generally designate a conventional nozzle for a conventional solid propellant rocket motor. As is conventional, the nozzle 110 is provided with an erosion resistent insert 11 which conforms with and is bonded to the inner surface of the nozzle 110, in any conventional manner.

The throat portion 112 of the nozzle 110 is provided with a plurality of openings 113, the number required depending upon the flight operational requirements of the solid propellant rocket motor to which the nozzle 110 is connected. A plurality of circular threaded flanges 114 are formed integrally with the outer surface of the throat portion 112 and each of the flanges 114 define thereby an extension of each of the openings 113. The insert 111 is provided with a plurality of openings 115 and there is an opening 115 in axial alignment with each of the openings 113 in the insert 111 and it is in the openings 113 and 115 that this form of the throttling mechanism 116 embodying the invention is mounted.

The throttling mechanism 116 comprises a circular housing 117 having an outer open internally threaded end 118 that is closed by an externally threaded disc 119 and having an open inner end 120 that is aligned with the opening 113 in the throat portion 112. Aligning pins 121 retain the alignment of the opening 113 and the open inner end 120 and an annular flange 122, contiguous with the open inner end 120 of the housing 117, is engaged by an internally threaded ring 123 that retains the throttling mechanism 116 in position, it being understood that there is a throttling mechanism 116 for each of the openings 113 in the throat portion 112 of the nozzle 110.

A partition 124 having a central bore 125 therein divides the housing 117 into an inner cylinder 126 and an outer cylinder 127, the volume of the cylinder 126 being extended by reason of the flange 114 and opening 113.

A piston 128 is mounted for reciprocation within the cylinder 127 and a piston rod 129 integral with the piston 128 and having a threaded end 130 thereon, extends through the bore 125 into the cylinder 126. An aligning key 131 extending into the cylinder 127 engages a slot 132 in the piston 128 to prevent rotation thereof during the reciprocation thereof when the throttling mechanism 116 is in operation, the rear face 133 of the piston 128 is bevelled to conform to a bevelled seat 134 in that side of the partition 124 facing the cylinder 127 and an O-ring 135 in the partition 124 coacts with the piston rod 129 to prevent leakage about the piston rod 129 as it reciprocates through the bore 125 in the partition 124.

The threaded end 130 of the piston rod 129 is threaded into a threaded socket 136 in the rear face of a piston 137 that is mounted for reciprocation within the cylinder 126. A circular skirt 138 is integral with the rear face of the piston 137 and the front face thereof has an integral centrally located boss 139 thereon that is received in a seat 140 in the rear face of a piston disc 141 centrally thereof and the piston disc 141 is made of an erosion resisting material and is reciprocal with the piston 137 within the opening 115 in the insert 111.

The piston disc 141 has a centrally located seat 142 in the front face thereof which receives a centrally located boss 143 on the rear face of a third piston 144 that is also made of an erosion resisting material.

Thus, the piston 144, the piston disc 141 and piston 137 reciprocate as a unit within the cylinder 126, flange 114 and openings 113 and 115 and an O-ring 145 in the throat portion 112 of the nozzle coacts with the piston 137 to prevent leakage about the piston 137 as it reciprocates within the opening 113.

Referring again to the housing 117, it will be noted that the housing 117 is provided with an inlet-outlet port 146 which communicates with the cylinder 126 and a fluid pressure supply line 147 is connected to the inlet-outlet port 146. The housing 117 is also provided with a second inlet-outlet port 148 that communicates with the cylinder 127 to which is connected a second fluid pressure supply line 149 and the supply lines 147 and 149 are connected to a fluid pressure supply system that may be mounted on the motor case of the solid propellant rocket motor or on the air frame therefor.

In assembling the throttling mechanism 116, the piston 144 is bonded to the piston disc 141 which in turn is bonded to the piston 137 so that these elements function as a unit. The piston 128 is then extended into the cylinder 127 and the piston rod 129 is connected to the piston 137 by the threaded end 130 thereof, the aligning key 131 is then suitably engaged in the slot 132 in the piston 128, the disc 119 is then screwed into place and the unitary assembly comprising piston 144, piston disc 141 and piston 137 are then inserted into the openings 113 and 115, the ring 123 is engaged with the flange 114, and the supply lines 147 and 149 are connected to inlet-outlet ports 146 and 148 for operation of the throttling mechanism 106 as is now described.

In this form of the invention, the area of the throat of the nozzle 110 that is outlined by the throat portion 112 is varied by extending the pistons 144 into the throat in a plane at right angles to the longitudinal axis of the nozzle 110 and the solid propellant rocket motor to which the nozzle 110 is connected.

The fluid pressure supply system to which the supply lines 147 and 149 are connected is connected to a suitable remotely controlled guidance system that may be mounted at any suitable location on the solid propellant rocket motor or the air frame therefor and when it is desired to vary the magnitude of the thrust of the solid propellant rocket motor fluid under presdure is fed to the cylinders 126 and the pistons 144 extend into the throat of the nozzle 110. If it is desired to withdraw the pistons 144 out of the throat, the fluid under pressure is bled out of the cylinder 126 and fluid under pressure is then fed into the cylinder 127. The insertion or withdrawal of the pistons 144 in relation to the throat of the nozzle 110, can be continued until burn out of the solid propellant grain in the solid propellant rocket motor to meet the flight requirements of the solid propellant rocket motor as required.

It is to be understood that the number of throttling mechanisms that are to be used and the angularity between the moving elements of each of the throttling mechanisms embodying the various forms of the invention and the discharge orifices of the nozzle are dependent upon the requirements of the flight operation of the solid propellant rocket motor with which the throttling mechanism is to be used.

Having thus described the invention what is claimed as new and desired to be secured by Letters Patent is:

1. In a throttling mechanism for use with a nozzle for a solid propellant rocket motor having at least one discharge orifice therein comprising, means positioned adjacent said discharge orifices and adapted to cover or uncover said discharge orifices to vary the magnitude of thrust of said solid propellant rocket motor, said means comprising at least one piston adapted to move over said discharge orifice to vary the size thereof, said throttling mechanism being mounted in the aft end of said propellant rocket motor, a molded insert of insulation mounted in the aft end adjacent said nozzle and means defining semi-circular grooves in said insert and said nozzle to provide cylinders for positioning said pistons.

* * * * *